United States Patent [19]

Sakakibara

[11] 4,455,892

[45] Jun. 26, 1984

[54] HYDRAULIC CONTROL MEANS FOR AN AUTOMATIC TRANSMISSION

[76] Inventor: Shiro Sakakibara, Minamiodori 4 chome, Toyokaya Aichi Prefecture, Japan

[21] Appl. No.: 345,642

[22] Filed: Feb. 4, 1982

[30] Foreign Application Priority Data

Sep. 4, 1978 [JP] Japan .................... 53-108852

[51] Int. Cl.³ .................................. B60K 41/10
[52] U.S. Cl. ........................... 74/869; 74/867
[58] Field of Search ............... 74/869, 868, 867, 863, 74/864

[56] References Cited

U.S. PATENT DOCUMENTS

| | | | |
|---|---|---|---|
| 3,093,010 | 6/1963 | Spreitzer et al. | 74/868 |
| 3,310,991 | 3/1967 | Leonard | 74/869 |
| 3,497,043 | 2/1970 | Leonard | 74/869 |
| 3,587,355 | 6/1971 | Schaefer | 74/868 |
| 3,667,323 | 6/1972 | Irie | 74/868 |
| 3,670,599 | 6/1972 | Nagamatsu | 74/869 |
| 3,744,348 | 7/1973 | Lemon | 74/869 |
| 3,818,783 | 6/1974 | Norris et al. | 74/867 |
| 3,895,542 | 7/1975 | Miyauchi | 74/868 |
| 4,050,332 | 9/1977 | Taga | 74/869 |
| 4,098,148 | 7/1978 | Wayman | 74/863 |
| 4,106,369 | 8/1978 | Taga | 74/868 |
| 4,111,072 | 9/1978 | Harmon et al. | 74/864 |
| 4,129,051 | 12/1978 | Shindo et al. | 74/867 |
| 4,143,563 | 3/1979 | Shindo et al. | 74/867 |
| 4,145,937 | 3/1979 | Shindo et al. | 74/867 |
| 4,148,232 | 4/1979 | Moriya | 74/867 |
| 4,291,596 | 9/1981 | Sakakibara | 74/868 |
| 4,301,697 | 11/1981 | Iwanaga et al. | 74/869 |

*Primary Examiner*—Allan D. Herrmann
*Assistant Examiner*—Joseph M. Rolnicki
*Attorney, Agent, or Firm*—Cooper, Dunham, Clark, Griffin & Moran

[57] ABSTRACT

Hydraulic control means for an automatic transmission having an improved shift valve which reduce the speed change shock at the speed change. Said shift valve has a sleeve having an oil chamber in which throttle pressure is put and an oil chamber by which governor pressure or servo pressure is received, a spring installed withstands the throttle pressure and governor pressure or servo pressure, and a spool which installs an oil chamber wherein the above-mentioned governor pressure is put, opens(closes) an oil passage connecting to the above-mentioned friction elements when the pressure in this oil chamber is more than the appointed value, and closes or opens the oil passage when the pressure is less than the appointed value, said spool forming an oil chamber wherein the servo pressure or governor pressure supplied to an oil chamber of the above-mentioned sleeve is put when the governor pressure is less than the appointed value.

4 Claims, 4 Drawing Figures

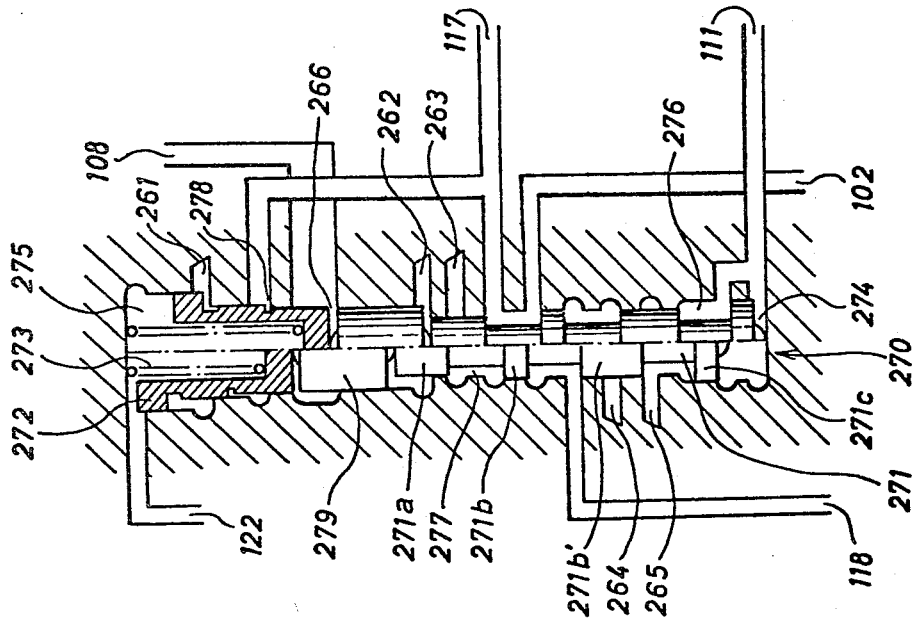
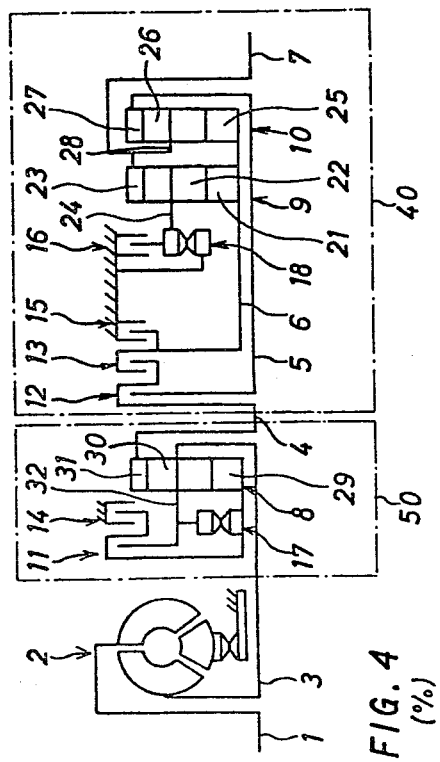
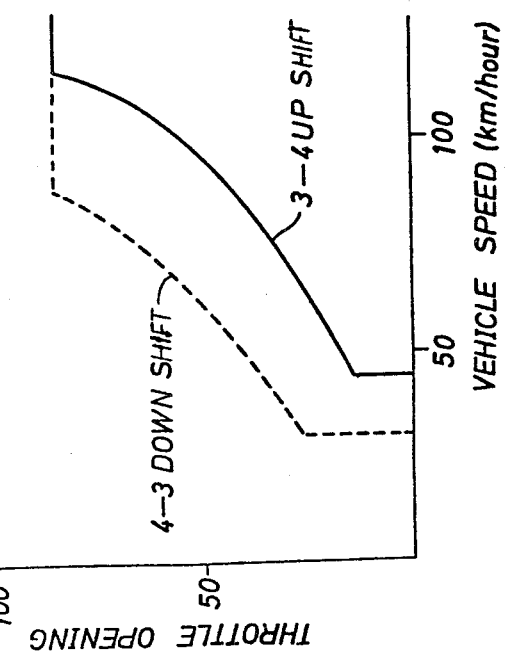

HYDRAULIC CONTROL MEANS FOR AN AUTOMATIC TRANSMISSION

This is a continuation of application Ser. No. 72,986 filed Sept. 6, 1979 now abandoned.

BACKGROUND OF THE INVENTION

1. Field of the Invention

The present invention relates to a hydraulic control means for an automatic transmission comprising a fluid torque converter and a gear system used for vehicles such as an automobile and the like.

A fluid automatic transmission is, as is well known, constructed in such a way that the shift is automatically controlled relating to the vehicle speed and throttle opening. The vehicle speed is transformed into a hydraulic signal proportional to the vehicle speed by a governor valve, and the throttle opening is transformed into a hydraulic signal proportional to it by a throttle valve. These two hydraulic signals are led to more than one or two shift valves, and shift control is completed by engaging brakes or clutches attached to a gear system. Such fluid automatic transmission has such a characteristic that shift transition is normally controlled on a shift line related to the throttle opening and vehicle speed, and this shift line operates such that vehicle speed is higher as the throttle opening is larger. This hydraulic control means is constructed in such a way that a further hysteresis effect is given to shift characteristic, in order to stabilize the operation of an automatic transmission near the shift point and in case of down-shift, the down-shift is performed by vehicle speed lower than vehicle speed at the up-shift if the throttle opening is the same. It is further required for the shift characteristic that in order to prevent the shock at the shift transition, the width of hysteresis at high throttle opening is made as large as possible, and further in order to make the range for use at a high speed stage large, the width of hysteresis at low throttle opening is made as small as possible.

2. Description of the Prior Arts

Hitherto, there difficulties have arisen in that that shift shock is liable to be caused when the width of hysteresis is small, and especially the shift shock does not cease to be caused in case of the running on a severe road in going up and down at overdrive (4-speed) or 3-speed in the relation to the shift characteristic at going-up of a slope. A method to improve a conventional shift valve has been devised to give a hysteresis effect to the shift characteristic, in order to stabilize the operation of an automatic transmission near the shift point by noticing these difficult points as disclosed in U.S. Pat. no. 4,143,563 and so on, but this method had the defect that the width of hysteresis becomes narrow partially in some conditions and shift hunting is liable to be caused, because of sudden change in the width of hysteresis at a certain opening of the accelerator.

SUMMARY OF THE INVENTION

The object of the present invention is to provide a hydraulic control means for an automatic transmission in which shift characteristic is improved.

Another object of the invention is to provide a hydraulic control means for an automatic transmission in which the size of hysteresis between up-shift point and down-shift point on the shift line is improved, and the shift shock at the shift transition is reduced;

Still another object of the invention is to provide a hydraulic control means for an automatic transmission in which the size of hysteresis between up-shift point and down-shift point is changeable with good correspondence according to the change in throttle opening or vehicle speed.

Other objects and advantages of this invention will be made apparent as the description progresses.

BRIEF DESCRIPTION OF THE DRAWINGS

FIG. 1 is a skeleton diagram showing a driving mechanism for an automatic transmission where this invention is applied;

FIG. 3 is a drawing of longitudinal section showing the important part of a hydraulic control means for an automatic transmission shown in FIG. 2;

FIG. 4 is a shift diagram obtained by the unit of a preferred example shown in FIG. 2.

DETAILED DESCRIPTION OF THE PREFERRED EMBODIMENT

Figure 2:
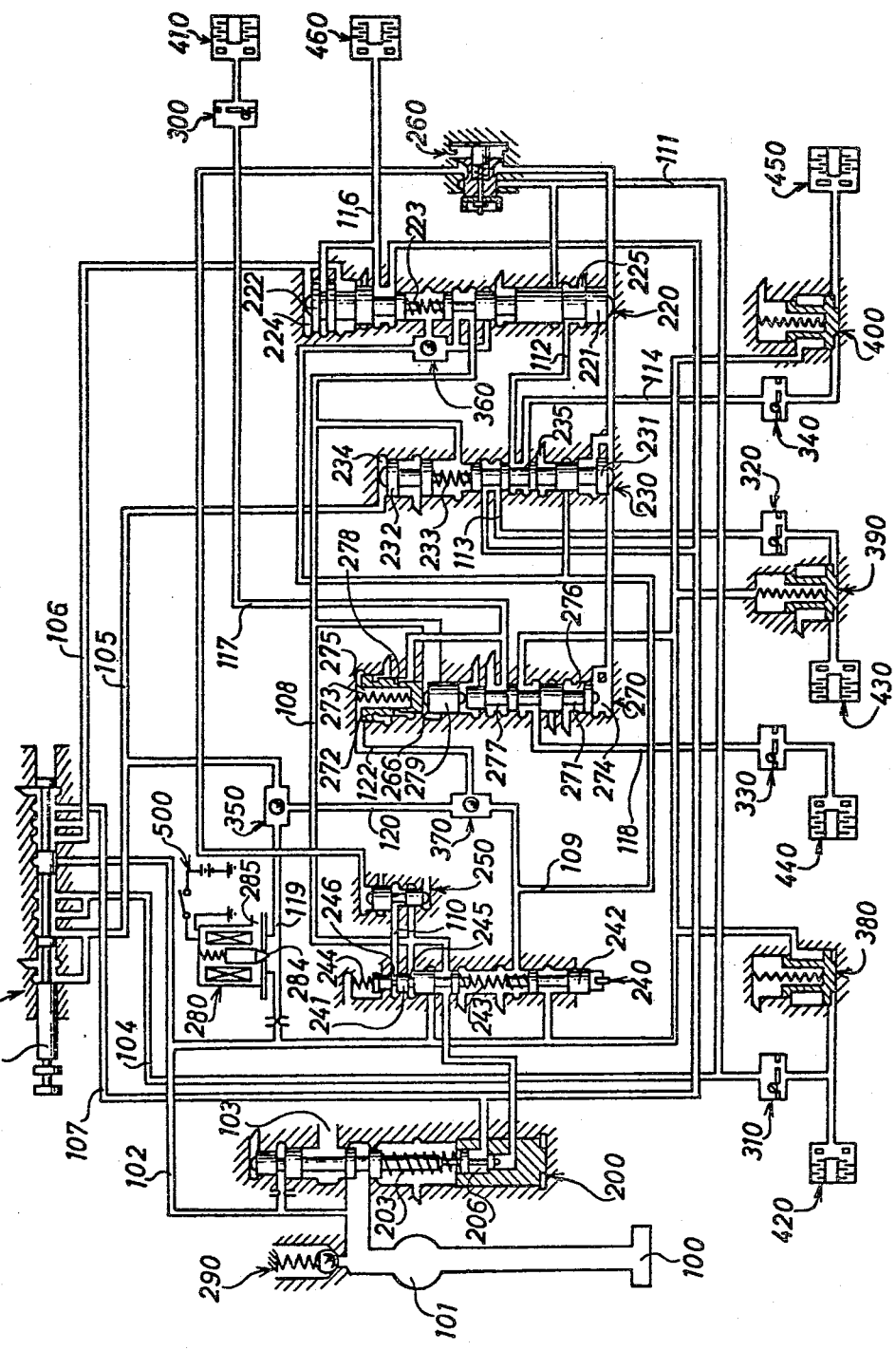
FIG. 2 is a preferred example of a hydraulic control means for an automatic transmission of this invention.

FIG. 1 shows an automatic transmission of four forward drives and a reverse drive containing overdrive ratio of the system where a sub-transmission (overdrive unit) 50 is added to a main transmission 40 of three forward drives and a reverse drive as an automatic transmission where the present invention is applied.

As to the automatic transmission of the present invention, an output shaft 1 of a motor, a torque converter 2, a sub-transmission input shaft 3, intermediate shafts 4, 5 and 6, a main transmission output shaft 7 and three sets of planetary gears 8, 9 and 10 are arranged concentrically, and further three clutches 11, 12 and 13, three brakes 14, 15 and 16 and two one-way clutches 17 and 18 are equipped.

The main transmission 40 comprises the intermediate shafts 4 (output shaft of a sub-transmission 50), 5 and 6, the main transmission output shaft 7, two sets of planetary gears 9 and 10, two clutches 12 and 13, two brakes 15 and 16 and a one-way clutch 18, and the intermediate shaft 4 is connected to each intermediate shaft 5, 6 through two clutches 12 and 13. Two sets of planetary gears 9 and 10 comprise sun gear 21, 25, planetary pinion 22, 26, ring gear 23, 27 carrier 24, 28, respectively. The intermediate shaft 5 is connected to a ring gear 27 of the planetary gear 10, and the intermediate shaft 6 is connected to sun gears 21, 25 of the planetary gears 9, 10, and is equipped with the brake 25. The main transmission output shaft 7 is connected to the ring gear 23 of the planetary gear 9, and at the same time, is connected to the carrier 28 of the planetary gear 10. The carrier 24 of the planetary gear 9 is equipped with the one-way clutch 18 and the brake 16.

The sub-transmission 50 arranged on the front of the main transmission comprises the input shaft 3, the intermediate shaft 4 (i.e. the shaft of the sub-transmission 50), the planetary gear 8, the clutch 11, the brake 14, and the one-way clutch 17. The planetary gear 8 comprises a sun gear 29, a planetary pinion 30, a ring gear 31, and a carrier 32, while the carrier 32 is connected to the input shaft 3 and the ring gear 31 is connected to the intermediate shaft 4. The clutch 11 and the one-way clutch 17 are installed between the carrier 32 and the sun gear 29. In addition to this, the sun gear 29 is equipped the brake 14.

A summary of the operations of clutches 11, 12 and 13, brakes 14, 15 and 16, and one-way clutches 17 and 18 at each shifting stage of the automatic transmission of the present invention comprising such components leads to Table 1.

TABLE 1

|  | 11 | 12 | 13 | 14 | 15 | 16 | 17 | 18 | Ex. of reduction gear ratio |
|---|---|---|---|---|---|---|---|---|---|
| 1st Speed | o | o |  |  |  | Δ | * | * | 2.45 |
| 2nd Speed | o | o |  |  | o |  | * |  | 1.45 |
| 3rd Speed | o | o | o |  |  |  | * |  | 1.00 |
| 4th Speed |  | o | o | o |  |  |  |  | 0.7 |
| Reverse | o |  | o |  |  | o | * |  | 2.22 |

In the Table 1 an open symbol o represents engagement of a clutch or brake; an open symbol Δ indicates that a clutch or brake is engaged by oil pressure by an engine brake; an asterisk * shows that a one-way clutch is locked only at engine drive. In addition to this, description of the operation at every shifting stage (i.e. shift position) is well known, and the description will be unnecessary. FIG. 2 is a hydraulic control circuit showing one preferred example of a hydraulic control device of the present invention. This hydraulic control device comprises an oil reservoir 100, an oil pump 101, a pressure regulator valve 200, a manual valve 210, a 1-2 shift valve 220, a 2-3 shift valve 230, a throttle valve 240, a cutback valve 250, a governor valve 260, an overdrive shift valve (i.e. 3-4 shift valve) 270, a solenoid valve 280, a relief valve 290, check valves 300, 310, 320, 330, 340, 350, 360 and 370, accumulators 380, 390 and 400, hydraulic cylinders 410, 420, 430, 440, 450 and 460, each of which is an oil chamber of a hydraulic piston operating each of clutches 11, 12, and 13, and of brakes 14, 15 and 16, and other various kinds of oil pressure circuits arranged mutually between these various kinds of valves and hydraulic cylinders.

The operation of this hydraulic control device will be described below.

A supply source of oil of a hydraulic control device, hydraulic oil of a torque converter 2, and lubricating oil at each area is an oil pump 101, and oil, which is sucked in by direct engine drive of the oil pump 101 from the oil reservoir 100, is discharged to an oil passage 102. Oil pressure of the oil passage 102 is a source of all hydraulic oil pressure and is called line pressure.

The line pressure is controlled by the pressure regulator valve 200 to the fixed pressure as will be mentioned later. The relief valve 290 is a line pressure relieving valve when the pressure becomes abnormally high. Oil is supplied to the torque converter 2 and each area to be lubricated from an oil passage 103 through the pressure control valve. The manual valve 210 comprises a spool 211 shifted by operating a lever at a driver's seat and functions as the mechanism leading the line pressure of the oil passage 102 by shift position of the lever to oil passages 104, 105, 106 and 107.

TABLE 2

| Shift position | Oil passage 104 | Oil passage 105 | Oil passage 106 | Oil passage 107 |
|---|---|---|---|---|
| R position | — | — | o | o |
| N position | — | — | — | — |
| D position | o | — | — | — |
| 2 position | o | o | — | — |
| L position | o | o | o | — |

An open symbol o in Table 2 shows that line pressure is being led to an oil passage of said open symbol o at each shift position, and an open symbol — shows that the line pressure is not being led to an oil passage on the column at the shift position. Operation of a transmission at each position is that R position is reverse, N position indicates neutral, D position is automatic shift at four forward drives, 2 position is automatic shift between the first forward speed and the second forward speed, and L position is a fixed position at the first forward speed.

At D position, line pressure is fed to the hydraulic cylinder through the check valve 310 and the accumulator 380 from an oil passage 104 and the clutch 12 is always engaged. In addition to this, at the stage of the first forward speed, the second forward speed and the third forward speed, the clutch 11 is engaged as mentioned later. The oil passage 104 leads the line pressure to a 1-2 shift valve 220 and the governor 260. The 1-2 shift valve 220 comprises spools 221, 222 and spring 223, and at the first forward speed, oil pressure of the oil passage 104 is not led in any direction, with the spool 221 being positioned downward shown in the FIG. 2. At the 2nd, 3rd and 4th forward speed, the spool 221, is shifted upward as shown in the figure by the action of governor pressure from the oil pressure 111 and pressurized oil of oil passage 104 is led to an oil passage 112. The oil passage is connected to the 2-3 shift valve 230 and operates a brake 15, with oil pressure being fed to a hydraulic cylinder of a brake 15 through the oil passage 114, a check valve 340 and an accumulator when a spool 231 is positioned downward as shown in the figure. When the brake 15 is engaged; a power transmission becomes the source of the second forward speed as shown in Table 1. The 2-3 shift valve 230 comprises spools 231, 232 and a spring 233, at the first forward speed and second forward speed, the spool 231 is positioned downward as shown in the figure and at the third forward speed and fourth forward speed, a clutch 13 is engaged with oil pressure of the oil passage 112 being led to an oil passage 113 due to the state where the spool 231 is shifted by the action of governor pressure from the oil passage 111 up ward in the figure and the oil pressure led to the oil passage 113 being fed to a hydraulic cylinder 430 of the clutch 13 through a check valve 320 and an accumulator 390. In addition to this, the oil passage 114 is connected to an oil exhaust port 235 and the brake 15 is disengaged, with oil pressure in the hydraulic cylinder 450 being exhausted from the oil exhaust port 235 through the oil passage 114. When the brake 15 is disengaged and the clutch 13 is engaged, the power transmission becomes the third forward speed as shown in Table 1.

An overdrive shift valve 270, comprising spools 271 and 279, a sleeve 272, a spring 273, oil chambers 266, 274, 275, 276, 277 and 278, wherein the spool 271 has different lands 271a, 271b (271') and 271c and changes over the connection of the oil passage 102 with an oil-passage 117 or an oil passage 118 in accordance with the oil pressure acting on oil chambers 266, 274, 276, 277 and 278, with each oil pressure being exhausted from the exhaust ports 261, 262, 263, 264 and 265.

A solenoid valve 280 is controlled by an overdrive change-over switch installed on a driver's seat. In the case where the overdrive change-over switch 500 is turned OFF, an opening 284 is closed. Oil pressure supplied through the oil passage 102 is supplied to the oil chamber 275 of the overdrive shift valve 270 through an oil passage 119, a check valve 350, an oil passage 120, a check valve 370 and an oil passage 122 and holds spools 271 and 279, and a spool 272 downward.

In case where the overdrive change-over switch is turned ON, the opening 284 is opened. Oil pressure in the oil chamber 275 is exhausted from an exhaust port 285 through the oil passage 122, the check valve 370, the oil passage 120, the check valve 350, the oil passage 119 and the opening 284. Throttle pressure is supplied to the oil chamber 266 from an oil passage 108, governor pressure is supplied to the oil chamber 274 from the oil passage 111 and the spool 271 is controlled in connection with the size of both pressures.

When the overdrive switch 500 is turned OFF, the line pressure in the oil passage 102 acts on the oil chamber 275 of the overdrive shift valve 270.

Thus, a clutch 11 is engaged, with spools 279 and 271 and a sleeve 272 being held downward in the FIG. 2 and oil pressure of the oil passage 102 being fed to the hydraulic cylinder 410 of the clutch 11 through the oil passage 117 and the check valve 300.

When the overdrive switch 500 is turned ON, throttle pressure acts on the oil chamber 266 of the overdrive shift valve 270 from the oil passage 108. Thus, the spool 271 of the overdrive shift valve 270 is controlled by oil pressure acting on the oil chamber 274 and oil chamber 275, and on the oil chamber 266 and 278, is positioned downward in the FIG. 2 at the states of the first forward speed, the second forward speed and the third forward speed low in governor pressure and the clutch 11 is engaged, with oil pressure of the oil passage 102 being fed to the hydraulic cylinder through the oil passage 117 and the check valve 300.

When the spool 271 is shifted upward in FIG. 2 with an increase in governor pressure, the clutch 11 is disengaged, with the oil passage 117 being connected to an oil exhaust port 263, at the same time, a brake 14 is engaged and the state of the fourth forward speed (overdrive), with oil pressure of the oil passage 102 being fed to a hydraulic cylinder 440 of the brake 14 through the oil passage 118 and the check valve 330.

At 2 position, line pressure is supplied to an oil passage 104 and an oil passage 105. Oil pressure led to the oil passage 105 is led to the oil chamber 234 of the 2-3 shift valve 230 and spools 231 and 232 are held downward as shown in the figure. In addition to this, the oil pressure led to the oil passage 105 is led to the oil chamber 275 of the overdrive shift valve 270 through the check valve 350, the oil passage 120, the check valve 370 and the oil passage 122, and spools 271 and 279 and the sleeve 272 are held downward as shown in the figure. Oil pressure of the oil passage 104 is led to the hydraulic cylinder 420, and at the same time is lead to the 1-2 shift valve 220. When the 1-2 shift valve 220 is not at the state of the first forward speed, a brake 15 is engaged, with oil pressure of the oil passage 104 being fed to the hydraulic cylinder 450 through the oil passages 112 and 114. When clutches 11 and 12 and the brake 15 are engaged, the power transmission becomes the source of the second forward speed as shown in Table 1. When the 1-2 shift valve 220 becomes the state of the first forward speed, the power transmission becomes the state of the first forward speed, with the spool 221 being shifted downward as shown in the figure, the oil passage 112 being connected to an oil exhaust port 225, oil pressure in the hydraulic cylinder 450 being exhausted from the oil exhaust port 225 through the oil passages 114 and 112, and the brake 15 being disengaged.

At L position, line pressure is led to oil passages 104, 105 and 106. Pressurized oil led to the oil passage 104 engages a clutch 12 as well as at each speed change state at D position.

Oil pressure led to the oil passage 105 holds spools 231 and 232 of the 2-3 shift valve 230 through the oil chamber 234 downward as shown in the figure, and at the same time, holds spools 271 and 279 of the overdrive shift valve 270 and the sleeve 272 downward as shown in the figure. Oil pressure led to the oil passage 106 holds spools 221 and 222 downward as shown in the figure because of the action of the oil pressure on the oil chamber 224 of the 1-2 shift valve 220, and at the same time, the oil pressure engage a brake 16, with it being fed to a hydraulic cylinder 460 of the brake 16 through an oil passage 116. When clutches 11 and 12 and the 16 are engaged in this way, the power transmission becomes the state of the first forward speed as shown in Table 1.

At R position, line pressure is led to oil passages 106 and 107. Oil pressure led to the oil passage 107 acts in such a way that the line pressure is allowed to increase, with the oil being led to an oil chamber 206 or valve 200, and at the same time, engages the clutch 13, with the oil being led to the oil passage 113 through the 2-3 shift valve 230. In addition to this, the oil pressure in the oil passage 107 engages the brake 16, with it being led to the oil passage 116 through the 1-2 shift valve 220. And it engages the clutch 11. When clutches 11 and 13, are engaged the brake 16 are engaged, and power transmission becomes the source of the reverse drive as shown in Table 1.

A governor valve 260 is installed on the output shaft 7 in FIG. 1. The governor valve 260 generates oil pressure (i.e. governor pressure) in the oil passage 111 that becomes the source of a number of rotations of an output shaft by the balance of centrifugal force, spring force and oil pressure, that is, the oil pressure that rises in accordance with an increase in number of rotation of the output shaft.

A throttle valve, comprising a spool 241, a downshift plug 242, springs 243 and 244, and oil chambers 245 and 246, generates throttle pressure proportional to throttle opening in an oil passage 108, by the equilibrium produced between the force of the spring 244 due to the shift of the downshift plug 242 interlocked by the movement of an accelerator pedal and the force of oil pressure acting on oil chambers 245 and 246. The throttle pressure in the oil passage 108, being connected to the overdrive shift valve 270 and valve 230, controls the timing of speed change in accordance with the state of engine load. In addition to this, if an accelerator pedal is strongly stepped in when kick-down in required, the oil passage 102 is connected to an oil passage 109 due to the upward travelling of the downshift plug 242, line pressure of the oil passage 102 is led to the overdrive shift valve 270 through the 1-2 shift valve 220, the 2-3 shift valve 230 and the check valve 270 by the medium of the oil passage, and shift down, such as the 4th forward speed to the 3rd forward speed, or the 3rd forward speed to the 2nd forward speed, or the 2nd forward speed to the 1st forward speed is performed by the equilibrium with governor pressure acting on the lower ends of spools 221, 231 and 271.

A cutback valve 250 generates cutback pressure in an oil passage 110 by the equilibrium of oil pressure. The cutback pressure of the oil passage 110 prevents unnecessary power loss due to an oil pump, with throttle pressure being allowed to lower by the action on the throttle valve 240.

A pressure regulator valve 200 generates line pressure in the oil passage 102 by the balance between oil pressure and the force of a spring 203.

Check valves 300, 310, 320, 333 and 340 comprise a check ball, an orifice, and a hole, respectively.

Each of accumulators 380, 390, and 400 controls the supply of oil pressure to oil cylinders 420, 430 and 450 of clutches 12 and 13 and a brake 15, and lessen the shock at the engagement of the clutch and the brake.

Shift control at a 3-4 upshift and 4-3 downshift, which is an object of the present invention, shall be described on the basis of a preferred example, referring to FIG. 3 and FIG. 4.

When governor pressure acting on the oil chamber 274 is less than the fixed value, if throttle pressure acting on the oil chamber 266 is less than the fixed value, a sleeve 272 is positioned at the lower position shown in the figure and if the throttle pressure is more than the fixed value, the sleeve 272 is positioned at the upper position shown in the figure. On the other hand, a spool 271 is pushed down by the force of a spring 273 or by throttle pressure acting on the oil chamber 266, by the first hysteresis pressure acting on the oil chamber 277 formed by the difference of area between land 271a and land 271b, and by the second hysteresis pressure acting on the oil camber 276 formed by the difference of area between land 271b' and land 271c to the lower position shown in the figure. In a case of a 3-4 upshift, when the throttle pressure acting on the oil chamber 266 is less than the constant value, if governor pressure acting on the oil chamber 274 rises with an increase in vehicle speed, the spool 271 is pushed up by the above-mentioned governor pressure and servo pressure acting on the oil chamber 278 to the upper position shown in the figure, against the force of the spring 273, the first and second hysteresis pressure which act on to the lower position shown in the figure, each oil pressure in oil chambers 276, 277 flows out of the exhaust port 265 or 263, and the upshift fom Third to Fourth is completed. In the same way, when the throttle pressure acting on the oil chamber 266 is more than the constant value, if governor pressure acting on the oil chamber 274 rises with an increase in vehicle speed, the spool 271 is pushed up to the upper position shown in the figure by the abovementioned governor pressure, against the first and second hysteresis pressures acting on to the lower position shown in the figure and the throttle pressure acting on to the lower position shown in the figure and the throttle pressure acting on the oil chamber 266, each pressurized oil in oil chambers 276, 277 flows out of the exhaust ports 265, 263 and the 3-4 upshift is completed.

In a case of a 4-3 downshift; vehicle speed becomes a shift point in such a case as the governor pressure acting on the oil chamber 274 becomes smaller than the force of the spring 273, when the throttle pressure acting on the oil chamber 266 is less than the force of the spring 273. In the same way, vehicle speed becomes a shift point in such a case as the governor pressure acting on the oil chamber 274 becomes smaller than the throttle pressure acting on the oil chamber 266, when said throttle pressure is more than the force of the spring 273.

Hysteresis width given to shift characteristics will be described below.

In a case where the throttle pressure acting on the oil chamber 266 is less than the constant value, hysteresis width is given to shift characteristics, the hysteresis width being equivalent to the portion where the first and second hysteresis pressures acting on the oil chambers 277 and 276 are subtracted by servo pressure acting on the oil chambers 278.

In case where the throttle pressure acting on the oil chamber 266 is more than the constant value and becomes smaller than the force of the spring 273, hysteresis width is given to shift characteristics, the hysteresis width being equivalent to the portion where the first and second hysteresis pressures acting on the oil chamber 262 are substracted by the firce of the spring 273.

In case where the throttle pressure acting on the oil chamber 266 is more than the force of the spring 273, hysteresis width equivalent to the portion of the first and second hysteresis pressures acting on the oil chambers 277, 276, is given to shift characteristics.

Summarizing the above described contents by simple numerical expression leads the Table 3.

TABLE 3

| PT | PG st 3-4 upshift | PG at 4-3 downshift | Hysteresis |
|---|---|---|---|
| $PT < Ps-q$ | $PG > h_1+h_2+Ps-q$ | $PG < Ps$ | $h_1+h_2-q$ |
| $Ps-q \leqq PT < Ps$ | $PG > h_1+h_2+PT$ | " | $h_1+h_2+PT-Ps$ |
| $Pt \geqq Ps$ | " | $PG < PT$ | $h_1+h_2$ | wherein,
- PT: pressure receiving area of oil chamber 266 × throttle pressure.
- PG: pressure receiving area of oil chamber 274 × governor pressure
- Ps: force of spring 273
- q: difference of area between lands forming oil chamber 278 × servo pressure
- $h_1$: difference of area between lands forming oil chamber 277 × servo pressure
- $h_2$: difference of area between lands forming oil chamber 276 × governor pressure (refer to FIG. 3 and FIG. 4)

As disclosed in the above, the present invention is that the hysteresis effect at 3-4 upshift and at 4-3 downshift was given by improving an overdrive shift valve, and the hysteresis width was gradually widened to shift characteristics to prevent the occurence of shift hunting, especially also at the opening of low throttle.

Further, it will be able to be easily understood that the present invention is not restricted only to an overdrive shift valve such as a preferred example, but is applicable quite equally also to a shift valve other than this.

We claim:

1. A hydraulic control means for an automatic transmission comprising:
   an input shaft,
   an output shaft,
   a planetary gear mechanism installed between said input shaft and said output shaft,
   plural friction elements including a friction clutch or a friction brake, wherein a gear ratio of plural stages in a forward-running and a gear ratio in a reverse running are obtained by engaging or releasing suitably said friction elements with hydraulic (oil) pressure,
   a source of oil pressure,
   a pressure regulator valve means controlling the pressure generated by said source, a governor valve means which generates governor pressure expressed according to driving speed, a throttle valve means which generates throttle pressure expressed according to driving load, and a shift valve means which changes over low speed and high speed by providing said throttle pressure and governor pressure, wherein said shift valve means comprises:

a primary valve means which acts between a position in low gear ratio and the position in high gear ratio, a secondary valve means which acts between the position disposed to said primary valve means in low gear ratio and the position disposed to said primary valve means in high gear, a spring means giving power to said secondary valve means in the direction to said primary valve means, a primary hydraulic pressure chamber, wherein said governor pressure pressing said primary valve means to the position of high gear ratio is input, a tertiary hydraulic pressure chamber, wherein said governor pressure is input when said valve means is in low gear ratio, wherein said primary valve means is pressed to the direction of low gear ratio, and said governor pressure is intercepted when said primary valve means is in high gear ratio, a fifth hydraulic pressure chamber, wherein said hydraulic pressure is input when said valve means is in low gear ratio, wherein said primary valve means is pressed to the direction of low gear ratio, and said hydraulic pressure is intercepted when said primary valve means is in high gear ratio, and said hydraulic pressure is connected to an exhaust port; and a secondary hydraulic pressure chamber, wherein said throttle pressure is input, said primary valve means is pressed to the position of low gear ratio, and said secondary valve means is pressed to the direction against spring means; and a fourth hydraulic pressure chamber, wherein said hydraulic pressure is input when said primary valve means is in low gear ratio, said secondary valve means is pressed to the direction against said spring means and said hydraulic pressure is connected to an exhaust port when said secondary valve means is in high gear ratio.

2. The hydraulic control means for an automatic transmission in accordance with claim 1, wherein said fourth hydraulic pressure chamber is connected to said fifth hydraulic pressure chamber.

3. The hydraulic control means for an automatic transmission in accordance with claim 1, wherein said secondary valve means is formed in the form of a sleeve.

4. The hydraulic control means for an automatic transmission in accordance with claim 1, wherein said shift valve means is 3-4 shift valve.

* * * * *